Feb. 6, 1940. A. GOTHE 2,189,517
RADIO GONIOMETER
Filed April 13, 1938
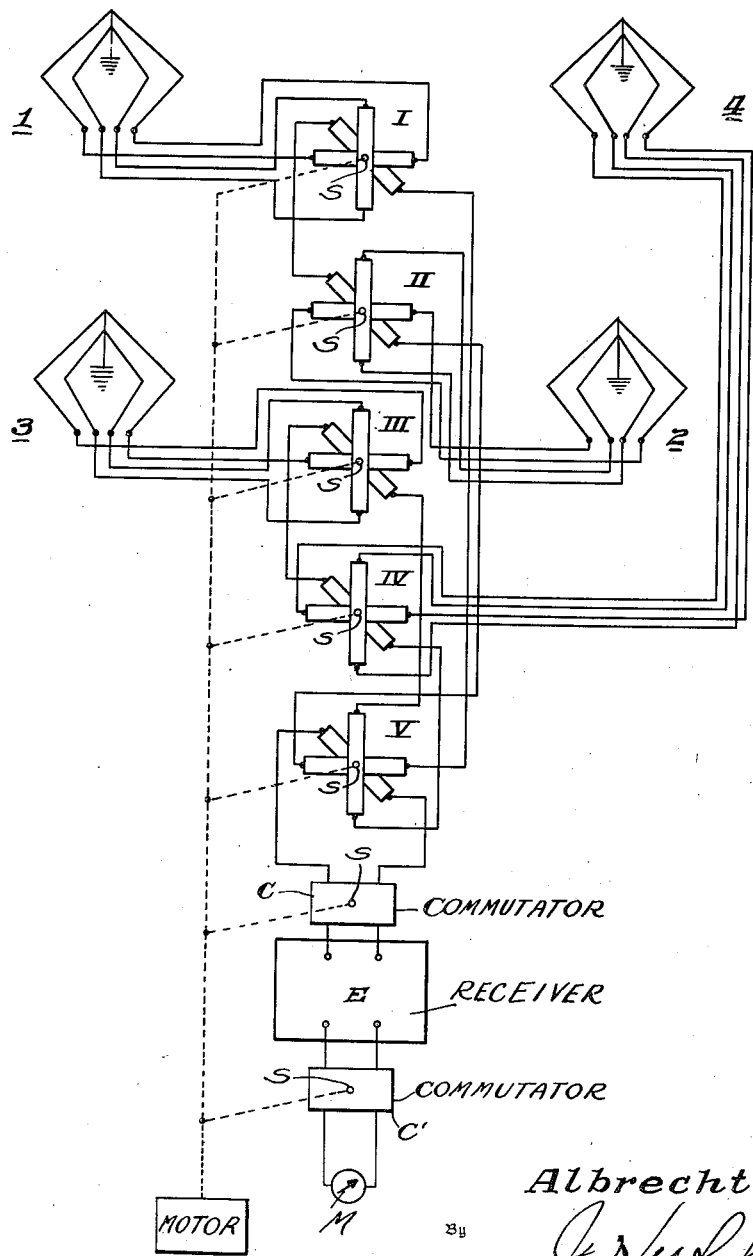
Inventor
Albrecht Gothe
By
Attorney Patented Feb. 6, 1940

2,189,517

UNITED STATES PATENT OFFICE 2,189,517

RADIO GONIOMETER

Albrecht Gothe, Berlin, Germany, assignor to Telefunken Gesellschaft für Drahtlose Telegraphie m. b. H., Berlin, Germany, a corporation of Germany Application April 13, 1938, Serial No. 201,673
In Germany April 7, 1937

2 Claims. (Cl. 250—11)

In the United States application Ser. No. 116,292, filed on Dec. 17, 1936, there is described a radio goniometer with several rotary frame or loop antennas. By such arrangement it is possible to overcome the adverse effects of waves reflected from the Kennelly-Heaviside layer.

To diminish the inertia of the parts to be revolved, it has been proposed to replace each one of the rotary frames by a crossed frame goniometer. Instead of the rotary double frames, eight fixed frames and five goniometers are used.

Now, when each goniometer is arranged adjacent the corresponding crossed frames it is difficult to move the rotary parts of these goniometers synchronously from one central point.

According to the present invention these difficulties are avoided thus: The goniometers, provided for the several frames, are placed in one point. The crossed frames are connected with their corresponding goniometers by transmission lines. Thus it is possible to move the rotary parts of all goniometers simultaneously.

In the present invention, further there is described means for determining the direction of a distant source of electromagnetic radiation, which distinguish the several ambiguous zero points.

The use of a frame antenna and a linear antenna in which the phase of one antenna and the indicator are periodically commutated to produce a cardioid reception pattern is well known. This system has been improved by so connecting the frame and the nondirectional antenna that the pointer of the indicator and the frame antenna move in the same sense. Such method shall be applied to a radio goniometer according to the present invention. For this purpose a system consisting of four antenna-goniometers and a coupling goniometer are used. To simplify the arrangement the axis of the rotary part of the coupling goniometer shall coincide with the axes of the other goniometers, and their rotors shall be mounted on a shaft S. By periodically commutating the search coil of this goniometer and the indicator of the receiver synchronously with the rotation of the shaft S the ambiguous zero points of the direction finder are distinguished.

The invention will be better understood by referring to the following short description and the accompanying drawing which represents an embodiment of this invention.

The direction finder according to the present invention contains in the chosen instance four systems each consisting of a pair of crossed frames (1, 2, 3, 4) with the corresponding antenna goniometers (I, II, III, IV). These goniometers are connected with the crossed frames by means of transmission lines, such as cables. The search coils of the four antenna goniometers are connected to the fixed coils (field coils) of the coupling goniometer V; the search coil of goniometer V being connected to the input circuit of the receiver E through a commutator C. The output of the receiver is connected to an indicator meter M through a commutator C. The two commutators are mounted on the shaft S which is utilized to rotate the goniometer search coils.

As a result of the synchronous commutation, the indicator moves to the right or left when the crossed loop antenna system is rotated, thus giving a sense indication and also providing a system which is free from night effect.

To reduce the antenna effect of the crossed frames these frames shall be constructed in the manner that the leads to the frame ends divide symmetrically the planes enclosed by the frames. The leads are then connected with the frame ends on the high potential point. Then both crossed frames of each system may be connected together and preferably earthed in the low potential crossing point.

I claim:

1. In a direction finder system, a plurality of crossed loop antennas, a plurality of antenna goniometers and a coupling goniometer having fixed field coils and rotatable search coils associated therewith, means connecting associated crossed loop antennas to respective associated antenna goniometer field coils, means connecting the rotatable search coils of said antenna goniometers to the fixed field coils of said coupling goniometer, a radio device, means including a commutator connecting said radio device to said coupling goniometer search coil, an indicator, means including a second commutator connecting said indicator to said radio device, and means for synchronously operating said commutators and said rotatable search coils.

2. In a direction finder system, a plurality of crossed loop antennas, a plurality of antenna goniometers and a coupling goniometer having fixed field coils and rotatable search coils associated therewith, means connecting associated crossed loop antennas to respective associated antenna goniometer field coils, means connecting the rotatable search coils of said antenna goniometers to the fixed field coils of said coupling goniometer, a radio device, means including a commutator connecting said radio device to said coupling goniometer search coil, an indicator, means including a second commutator connecting said indicator to said radio device, a shaft connected to said search coils and said commutations, and means for rotating said shaft.

ALBRECHT GOTHE.